United States Patent

[11] 3,602,462

[72] Inventors Richard J. Slater;
  Lelan R. Jamison, Jr., both of Northfield, Minn.
[21] Appl. No. 811,881
[22] Filed Apr. 1, 1969
[45] Patented Aug. 31, 1971
[73] Assignee G. T. Schjeldahl Company
  Northfield, Minn.

[54] PARACHUTE
  4 Claims, 3 Drawing Figs.

[52] U.S. Cl. ........................................... 244/145
[51] Int. Cl. ........................................ B64d 17/02
[50] Field of Search ............................... 244/142, 145

[56] References Cited
  UNITED STATES PATENTS

| | | | |
|---|---|---|---|
| 2,412,392 | 12/1946 | Finken | 244/145 |
| 2,745,615 | 5/1956 | Fogal | 244/145 |
| 3,104,856 | 9/1963 | Knacke et al. | 244/145 |
| 3,127,137 | 3/1964 | Downing | 244/145 |
| 3,331,573 | 7/1967 | Winker et al. | 244/145 |

*Primary Examiner*—Milton Buchler
*Assistant Examiner*—Carl A. Rutledge
*Attorney*—Orrin M. Haugen ABSTRACT: Stress-tailored bodies for aerial decelerator devices, such as cross parachutes, comprising at least a pair of flexible segments secured together to form the decelerator structure. The segments forming the decelerator structure are formed of either a nonporous film or a woven nylon fabric of the type normally employed for parachute structures. Reinforcing scrim or lines are secured to the surface of the segments with certain of the scrim axes being generally oblique to the axis of the particular segment, and in addition, load lines or additional reinforcement is applied having an axis generally parallel to the axis of the particular segment at the point where it is applied. Load or shroud lines are also provided which extend along the edges of the individual segments, with the free ends of these load lines being secured to a common load ring or member.

PATENTED AUG31 1971

3,602,462

INVENTORS
RICHARD J. SLATER
LELAN R. JAMISON, JR.
BY
Orrin M. Haugen
ATTORNEY

PARACHUTE

The present invention relates generally to an improvement in parachute or other types of aerial decelerator structures, and more specifically to this type of structure which comprises a pair of generally rectangular flexible segments secured together in common crossover zone relationship. In addition to the flexible segments, the cross parachute structure may also include mesh gores secured to lateral edges of the individual rectangular segments so as to form a substantially circular structure. The structure of the present invention provides a shaped structure which is light in weight, has few seams, and which has extremely stable flight or deceleration characteristics and good shock resistance.

In the design and manufacture of aerial decelerator structures, it is generally necessary to provide for controlled passage of air through the structure, for example the parachute canopy, or through portions thereof, in order to achieve aerodynamic stability. This control in decelerator devices is ordinarily accomplished by using a structure fabricated from air permeable material, or by utilizing cohesive nonporous or nonpermeable films having openings or pores therein to achieve air permeability. With the advent of nonporous material including plastic films and the like, which films have the strength for withstanding the rigors of operation as a parachute canopy, various weight, strength and cost advantages can be gained by the utilization of this material. An example of material which is commercially available and which has sufficient strength to be employed in aerial decelerator operations is stress-oriented polyethylene terephthalate, this material being available from E. I. DuPont deNemours Corp. of Wilmington, Delaware, under the code name of "Mylar." In the structure of the present invention, this film material is reinforced with a suitable scrim or webbing, the scrim or webbing providing the resistance to tear which is ordinarily deemed desirable.

The nonporous films are generally available in a variety of film thicknesses, widths and lengths, this availability being limited to flat sheets of material for economic reasons. Parachute structures in accordance with the present invention can conveniently be fabricated from flat material, the canopy conforming to the desired configuration upon exposure to a dynamic air stream during use as a decelerator. The canopy is formed so as to achieve optimum drag, stability and strength along with a minimum of area, and a minimum of weight.

Specifically, and in one aspect of the present invention, the parachute canopy or structure consists of a pair of generally rectangular flexible segments, each segment having an elongated axis, the segments being coupled together at right angles, one to another, and having a common crossover zone at the center thereof with extension arms extending outwardly from the common crossover zone. In this embodiment, reinforcing scrim is secured to the surface of each of the segments, the scrim including material arranged generally obliquely to the axis of the supporting segment, as well as material arranged parallel to the axis of the segments. In addition, load lines are provided over the canopy structure, these load lines being disposed along the edges and generally parallel to the axis of the individual rectangular segments and extending beyond the ends thereof to a common load member. It has been found that this structure achieves high stability and high drag with a minimum usage of material and a consequent reduction in weight.

Therefore, it is an object of the present invention to provide an improved aerial decelerator structure having improved strength and stability, improved drag, and reduced weight.

It is yet a further object of the present invention to provide an improved aerial decelerator in the form of a cross parachute which provides an optimum relationship between the area of material used for shaping the canopy, and the arrangement of reinforcing material for strengthening the structure while it is functioning as an aerodynamic decelerator.

Other and further objects of the present invention will become apparent to those skilled in the art upon a study of the following specification, appended claims, and accompanying drawing wherein:

Figure 1:
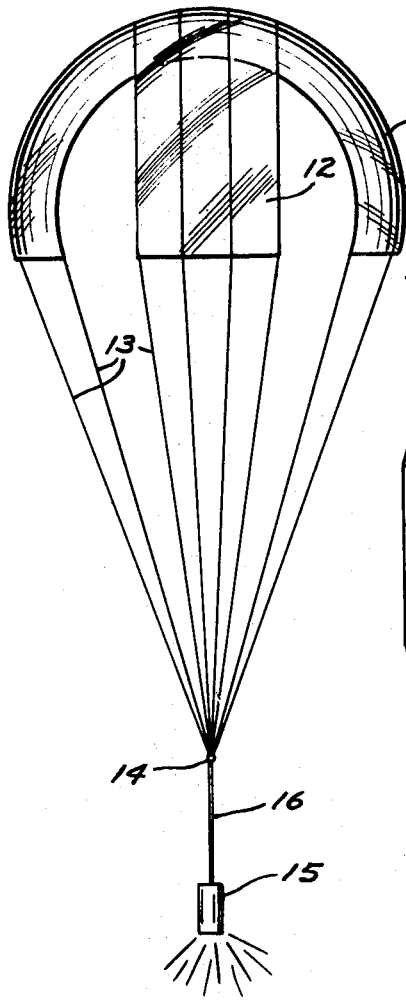
FIG. 1 is an elevational view of the parachute shown in descent, the parachute being constructed in accordance with the principals of the present invention.

In accordance with the preferred modification of the present invention, the parachute structure shown in FIG. 1 comprises a canopy portion generally designated 10, the canopy including a pair of generally rectangular flexible segments 11 and 12, these segments having a plurality of shroud or load lines 13—13 depending therefrom. Normally, at least sixteen load or shroud lines will be employed, each line extending entirely over the canopy structure. A load-carrying member such as a ring 14 is disposed at the adjoining ends of each of the shroud lines 13—13, this point forming the apex of a solid angle or cone which includes the canopy structure 10 of the parachute. The structure as shown in FIG. 1 is illustrated carrying a load 15 depending from the member 14 by line 16.

Figure 2:
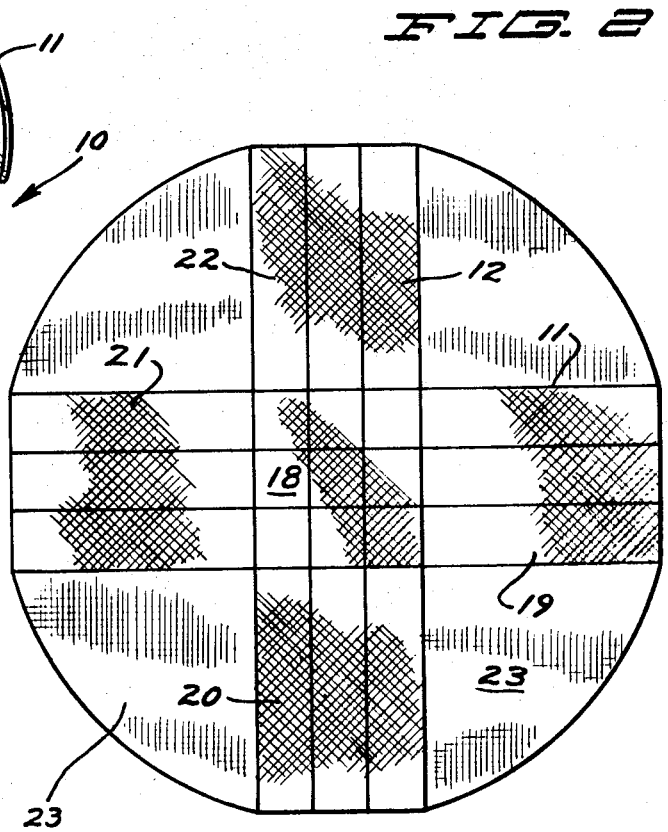
FIG. 2 is a plan view of a parachute constructed in accordance with the present invention, and showing the load lines broken away adjacent the ends of the individual segments.

With particular attention being directed to FIG. 2 of the drawing, the individual rectangular segments 11 and 12 are joined together at a common crossover zone 18, this zone being generally at the central portion of each of the rectangular segments 11 and 12. Extension arms 19, 20, 21 and 22 extend outwardly from the common crossover zone 18, as is indicated.

Along each of the adjoining lateral edges of the extension arms 19, 20, 21 and 22, there is arranged a gore element which is preferably in the form of a quarter circle, these gore elements being identified by the numeral 23. These gore segments are preferably loosely woven members such as, for example, a loosely woven member of 1,000 denier nylon having a center-to-center line spacing of 1 inch. This segment provides enhanced stability for the cross parachute structure.

Referring now to the individual rectangular segments 11 and 12, these segments may be fabricated from film material such as, for example, stress-oriented polyethylene terephthalate or the like. As an alternative, these individual rectangular segments may be fabricated from woven nylon, of a consistency similar to that utilized in conventional parachute canopies. The nylon material has a built-in permeability due to its inherent porosity. When utilized at low altitudes, it is frequently desirable to fabricate the structure from nylon since it is normally more readily deployed. When higher altitudes are being considered, such as, for example, altitudes in excess of about 300 feet, then, and in that application, polyethylene terephthalate films are advantageously employed.

Figure 3:
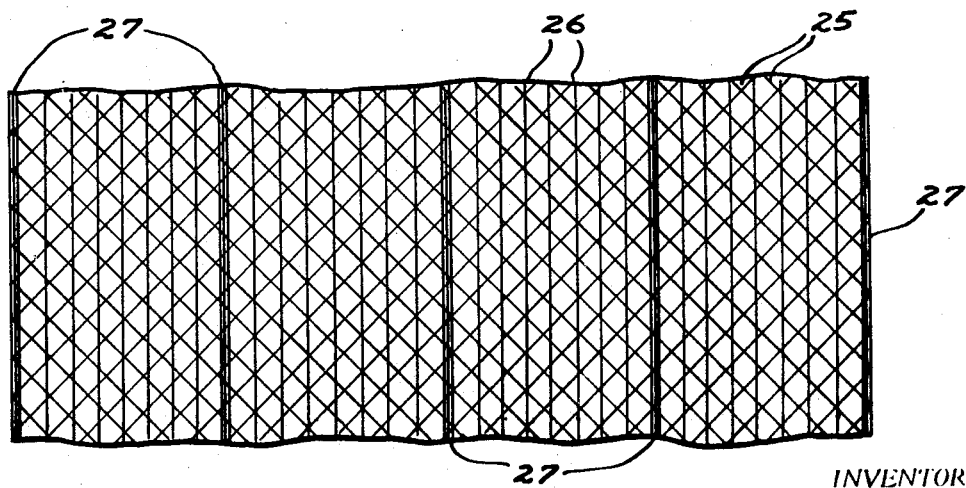
FIG. 3 is a detail plan view of a small portion of a rectangular segment ideally suited for use in connection with the parachute structure of the present invention.

Particular attention is now directed to FIG. 3 of the drawing wherein the scrim pattern is illustrated, the pattern being shown on a slightly enlarged scale over that utilized in FIG. 2. This scrim reinforcement is secured to the surface of the rectangular segments, preferably by means of adhesives or the like, such reinforcing scrim being conventionally applied to polyethylene terephthalate films by means of an adhesive film. In this connection, a first plurality of reinforcing scrim is arranged generally obliquely to the axis of the rectangular segment, these scrim lines being shown as at 25. A second plurality of reinforcing scrim is applied to the rectangular segment in a direction generally parallel to the axis of the individual segment. This scrim pattern is shown in FIG. 3 as at 26. A further plurality of reinforcing lines is shown in FIG. 3 at 27, the lines 27 forming the dual function of reinforcing lines and shroud lines. In the segment shown in FIG. 3, five individual shroud lines are shown being secured to the surface of the rectangular segment, this being in contrast to the four individual lines shown in FIGS. 1 and 2. Generally speaking, in parachutes made in accordance with the present invention, a minimum of four shroud lines will be employed for purposes of stability. It will be apparent that the lines 27 of FIG. 3 correspond generally to the lines 13 of the embodiment shown in FIG. 1.

The individual rectangular segments are formed so as to have a length to width ratio of about 3. In one typical embodiment, a parachute capable of use with payloads of about 20 pounds will utilize rectangular segments having lengths of 20.6 feet, and widths of 6.33 feet. Larger structures will be employed for larger payloads, or for payloads capable of more rapid descent rates. In this typical structure, the oblique scrim shown at 25 in FIG. 3 will preferably be nylon of 440 denier placed at 1-inch centers. The longitudinal material shown at 26 will preferably be 1,000 denier placed on 1-inch centers. The load or shroud lines 27 will also preferably be bundles of five 1,000 denier yarns placed at equal intervals across the width of the member.

In such a typical structure, performance characteristics as compared to a circular flat parachute are shown in table 1 below.

TABLE 1.—PARACHUTE PERFORMANCE COMPARISON

|  | Cross | Circular flat |
|---|---|---|
| Drag coefficient, $C_{D^o}$ | = 0.69 | 0.74 |
| Nominal area, $S^o$ | = 221 ft.$^2$ | 202 ft.$^2$ |
| $C_{D^o}S^o$ | = 154 ft.$^2$ | 151 ft.$^2$ |
| Stability | = ±5° | ±20° |
| Down time | = $T_1$ | $T_1$ |

It will be seen that the drag coefficient for the cross parachute is substantially equal to the drag coefficient of the circular flat parachute, and that the stability is far greater. The stability is given in degrees of rocking experienced by the parachute during descent. Also, it will be observed that the descent time is substantially equal for the two parachute structures.

As aids in deployment, inflatable toroidal members may be utilized about the periphery of the structure, if desired, however experience has determined that these aids are not normally required, since the structure deploys readily and rapidly.

It will be appreciated that the parachute structure of the present invention may be employed for use with a variety of payloads, including personnel, if desired. The structure is rugged, dependable, and highly stable during deceleration descents.

What we claim is:
1. Cross parachute means comprising:
   a. a pair of generally rectangular flexible segments of a certain limited porosity, each segment having an elongated axis, the segments being disposed at right angles one to another and having a common crossover zone generally at the central portions thereof, and extension arms extending outwardly from said common crossover zone;
   b. a first plurality of reinforcing scrim secured to the surfaces of said segments with the scrim axes extending generally obliquely to the axis of its supporting segment;
   c. a second plurality of reinforcing scrim secured to the surfaces of said segments with the scrim axes extending generally parallel to the axis of its supporting segment;
   d. a third plurality of reinforcing scrim secured to the surfaces of said segments with the scrim axes extending generally parallel to the axis of its supporting segment and extending beyond the ends of the segment and being secured to a common load member so as to form shroud lines for said parachute, the lines being secured to the supporting segment generally along the lateral edges thereof and at substantially equally spaced lateral intervals across the width of the supporting segment; and
   e. a gore fabricated from a material having a porosity substantially greater than that of said rectangular segments being disposed along and secured to adjacent lateral edges of each pair of mutually adjacent extension arms, said gore extending substantially the entire extent of each of said extension arms.

2. The cross parachute means as defined in claim 1, being particularly characterized in that said rectangular segments are nonporous flexible film members.

3. The cross parachute means as defined in claim 1 being particularly characterized in that said second plurality of reinforcing scrim is disposed at frequent intervals across said segments, and wherein said third plurality of reinforcing scrim members consists of at least four substantially equally spaced lines.

4. The cross parachute means as defined in claim 1 being particularly characterized in that the dimensional length to width ratio of the individual rectangular segments is substantially 3.